US009381605B2

(12) United States Patent
Moyer

(10) Patent No.: US 9,381,605 B2
(45) Date of Patent: Jul. 5, 2016

(54) COLLAPSIBLE WORKSTATION

(71) Applicant: David A. Moyer, New Castle, PA (US)

(72) Inventor: David A. Moyer, New Castle, PA (US)

(73) Assignee: HMC Holdings, LLC, Wampum, PA (US)

( * ) Notice: Subject to any disclaimer, the term of this patent is extended or adjusted under 35 U.S.C. 154(b) by 0 days.

(21) Appl. No.: 14/475,605

(22) Filed: Sep. 3, 2014

(65) Prior Publication Data

US 2016/0058171 A1 Mar. 3, 2016

(51) Int. Cl.
*A47B 3/00* (2006.01)
*B23Q 3/18* (2006.01)
*A47B 3/08* (2006.01)
*B25H 1/00* (2006.01)
*A47B 83/04* (2006.01)

(52) U.S. Cl.
CPC ............... *B23Q 3/18* (2013.01); *A47B 3/0803* (2013.01); *B25H 1/00* (2013.01); *A47B 83/045* (2013.01); *A47B 2003/0806* (2013.01)

(58) Field of Classification Search
CPC ...................................................... A47B 43/00
USPC .......... 312/258, 262, 277; 108/48, 77, 78, 79, 108/134, 162, 179; 144/285, 286.1
See application file for complete search history.

(56) References Cited

U.S. PATENT DOCUMENTS

| | | | |
|---|---|---|---|
| 357,506 A | 2/1887 | Slatee | |
| 1,160,380 A | 11/1915 | Converse | |
| 1,576,034 A | 5/1923 | Butt | |
| 1,459,930 A | 6/1923 | Riehle | |
| 1,688,533 A | 10/1928 | Eger | |
| 2,587,177 A | 2/1952 | Larson | |
| 2,943,896 A | 7/1960 | Gaston | |
| 3,342,226 A | 9/1967 | Marcoux | |
| 3,935,823 A | 2/1976 | England | |
| 4,068,601 A | 1/1978 | Marsh et al. | |
| 4,161,915 A | 7/1979 | Varmuza | |
| 4,617,869 A | 10/1986 | Denomey | |
| 4,646,497 A * | 3/1987 | Hoenle | ........................ 52/285.2 |
| 4,728,065 A * | 3/1988 | Coote | ........................... 248/129 |
| 4,875,513 A | 10/1989 | Skarsten | |
| 5,080,024 A | 1/1992 | Yamamoto | |
| 5,282,606 A | 2/1994 | Praiss | |
| 5,496,609 A * | 3/1996 | Michelstein | .................... 428/71 |

(Continued)

FOREIGN PATENT DOCUMENTS

CA 1168285 A1 5/1984
WO WO2012125038 A2 9/2012

*Primary Examiner* — Matthew Ing
(74) *Attorney, Agent, or Firm* — Vangelis Economou; Economou IP Law JMLS Patent Clinic

(57) ABSTRACT

A collapsible workstation includes stationary top, pivotable leg and collapsible top subassemblies. A collapsible work surface is attached to the stationary top subassembly by a hinge allowing the collapsible work surface to pivot vertically downwardly, but only slightly upwardly from the horizontal. The moveable leg subassembly, comprising two movable front legs each with support cups for receiving an anterior support crossbar of the collapsible work surface, is attached to the two stationary back legs by moveable leg hinges, which allow the two moveable front legs to fold inwardly. Once the legs clear the stationary work surface, the collapsible work surface may fold downward, resulting in the workstation being in a closed position. A stop bracket may be provided attached to the stationary base to inhibit the movable legs from pivoting beyond the position where the crossbar remains engaged in the support cups.

15 Claims, 12 Drawing Sheets

(56) References Cited

U.S. PATENT DOCUMENTS

| | | | |
|---|---|---|---|
| 5,592,887 A * | 1/1997 | Teng | 108/134 |
| 5,713,404 A | 2/1998 | Ladewig | |
| 6,039,416 A | 3/2000 | Lambert | |
| 6,041,723 A * | 3/2000 | Peterson | 108/115 |
| 6,161,486 A | 12/2000 | Boots | |
| 6,289,824 B1 | 9/2001 | Parker | |
| 6,401,631 B1 | 6/2002 | Kane et al. | |
| 6,431,091 B1 | 8/2002 | Chang | |
| 6,786,162 B1 | 9/2004 | Volkmer | |
| 6,811,233 B1 | 11/2004 | Packer | |
| 6,854,797 B1 | 2/2005 | Thomas | |
| 6,978,721 B2 | 12/2005 | Myers | |
| 6,997,115 B2 * | 2/2006 | Lockwood et al. | 108/115 |
| 7,044,178 B1 | 5/2006 | Campbell | |
| 7,066,098 B2 * | 6/2006 | Blasen et al. | 108/115 |
| 7,303,228 B1 | 12/2007 | Thomas | |
| 7,565,922 B2 | 7/2009 | Carter | |
| 7,604,027 B2 | 10/2009 | Thatcher | |
| 8,052,106 B2 | 11/2011 | Knudsen | |
| 8,066,042 B2 | 11/2011 | Carter | |
| 8,267,017 B1 | 9/2012 | Michael | |
| 2007/0034124 A1 | 2/2007 | Benson | |
| 2007/0221595 A1 * | 9/2007 | Chen | 211/103 |
| 2009/0000522 A1 | 1/2009 | Collins et al. | |
| 2012/0006234 A1 | 1/2012 | Marshall et al. | |
| 2012/0152155 A1 | 6/2012 | Healy | |
| 2012/0260833 A1 * | 10/2012 | Taylor | 108/69 |
| 2013/0152867 A1 | 6/2013 | Kaneda et al. | |

\* cited by examiner

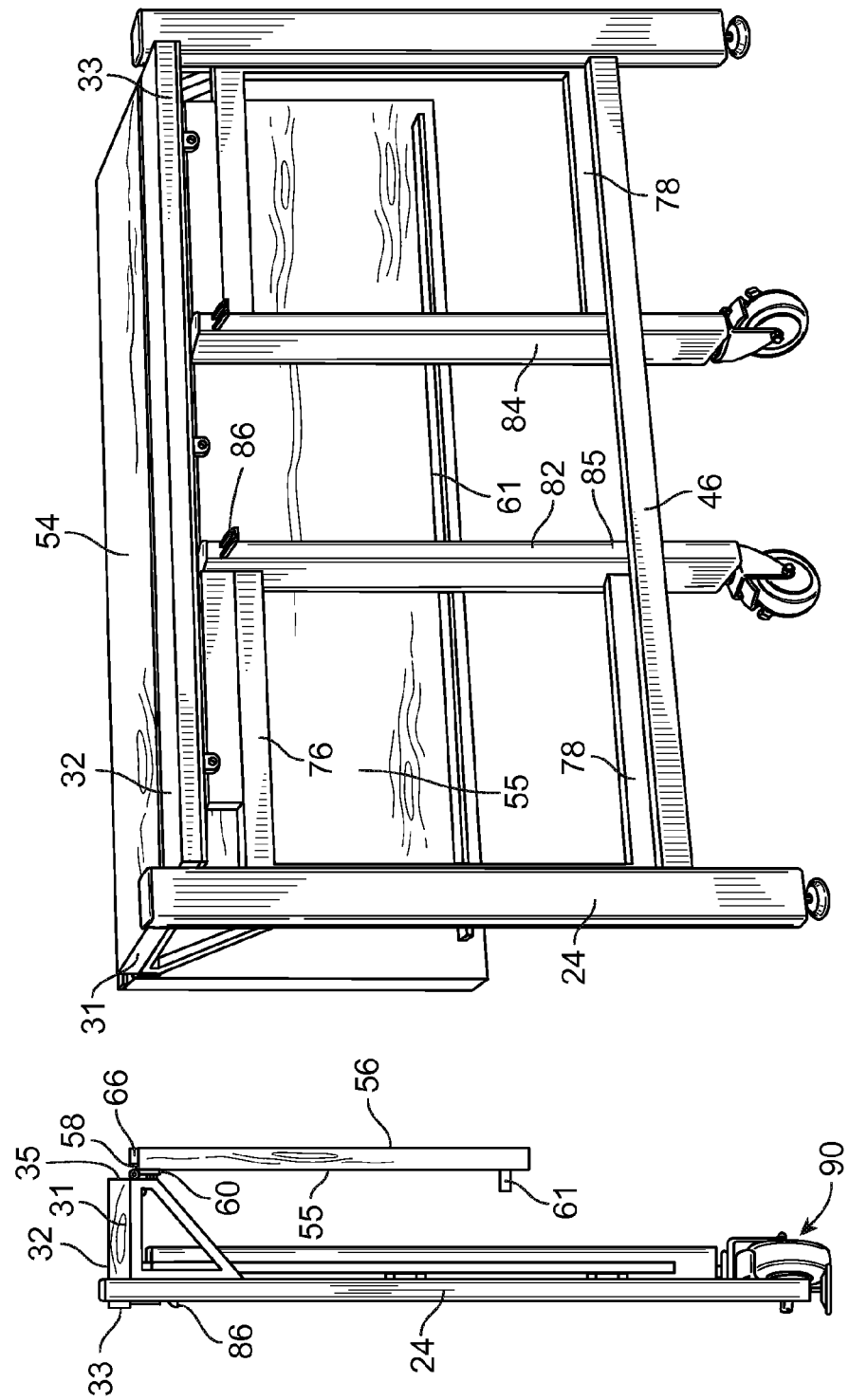

COLLAPSIBLE WORKSTATION

CROSS REFERENCE TO RELATED APPLICATIONS

This is a non-provisional of Provisional Application Ser. No. 61/874,088, filed on Sep. 5, 2013, the entire specification of which is incorporated by reference as if fully set forth herein.

BACKGROUND ART

1. Field of the Invention

The present invention relates generally to a workstation and relates more specifically to a workstation having the capability of collapsing to reduce the footprint that it occupies in confined spaces.

2. Background Art

Collapsible workstations are well-known for use in work spaces that have a limited area, for example basement work areas or garages. For example, U.S. Pat. No. 8,066,042, to Carter and entitled "Folding Work Bench," discloses a folding work bench with legs, which folds compactly for storage, and includes a pivotally mounted work table that can fold over to cover a back board on which tools may be stored for safekeeping. Carter also is the inventor of U.S. Pat. No. 7,565,922, also entitled "Folding Work Bench," is disclosing a work bench having folding legs pivotable in the vertical direction to align within an inner surface of the work bench. A pair of free standing legs supports the legs vertically when operational, but provides only minimal side support for the legs by foldable articulated struts.

Another U.S. Pat. No. 8,267,017 to Michael et al., entitled "Folding Workbench," discloses a folding workbench without legs, which includes a work surface pivotally mounted to a wall that can drop down to vertical storage position. U.S. Pat. No. 6,786,162, entitled "Space-saver workbench," discloses a collapsible folding workbench using a complicated spring system.

The heretofore known art work stations and methods of use teach mechanisms for workbench and methods of moving from a stored to a working position for storage of the workbench in limited spaces, but what is needed is a device and method that is more efficient and effective. The above cited patents introduce the general concept of a collapsible workbench, and various embodiments of implementation of that concept. However, they appear to be either complex or have too many moving parts that can go awry in the robust environment of a workbench that is susceptible to many and repeated heavy blows and intense use. Satisfactory without sacrificing ruggedness and stability to accommodate a vast array of industrial grade projects is necessary while still providing a simple and inexpensive platform for smaller grade projects by the average residential user. Ease of use, especially by one hand is preferable. Additionally, the present invention allows the user to save space. Furthermore, what is desirable is ease of use which allows a user to collapse the invention in a simple, yet efficient, manner.

SUMMARY OF THE INVENTION

To solve the problems described above, this invention provides for an improved workstation designed to be mounted to a wall. The present invention comprises three essential subassemblies: the stationary base subassembly, the pivotable top subassembly and the at least one movable front leg subassembly.

The stationary base assembly ideally comprises at least two stationary back legs, at least one wall mount attachment vertically positioned for attaching the stationary base to the wall, a stationary work surface in rectangular shape, having a planar bottom surface and top surface, a front edge, a back edge, and side edges, oriented in its longitudinal direction to extend along the wall when attached, and at least one stop bracket attaching the bottom of the stationary work surface to one of the at least two stationary back legs.

The collapsible work surface assembly comprises a collapsible work surface rectangular in shape having a planar top and bottom surface, a front edge and a complimentary back edge, and two complimentary side edges, the dimensions between the front and back edges of the collapsible work surface being essentially the same as the dimensions of the front and back edges of the stationary work surface. The collapsible work surface assembly further comprises a collapsible work surface hinge having a connection axis connecting the bottom surface of the stationary work surface to the bottom surface of the collapsible work surface, enabling the collapsible work surface to pivot, and an anterior support crossbar attached to the bottom surface and adjacent front edge of the collapsible work surface.

The movable front leg assembly comprises at least one movable front leg, at least one movable leg hinge attaching the at least one movable front leg to the stationary base, and a support cup for receiving the anterior support crossbar.

In additional alternative embodiments of the present invention, the stationary base assembly may include a backsplash, which may vary in design to include a perforated back splash, shelving configuration, cabinet configuration, or any combination of the like.

BRIEF DESCRIPTION OF THE DRAWINGS

The present invention will now be discussed in further detail below with reference to the accompanying figures in which:

FIG. 5 is a side view of the main embodiment of the present invention shown in the storage position;

FIG. 6 is a back perspective view of the main embodiment of the present invention shown in the storage position;

DETAILED DESCRIPTION OF THE PREFERRED EMBODIMENTS

Figure 1:
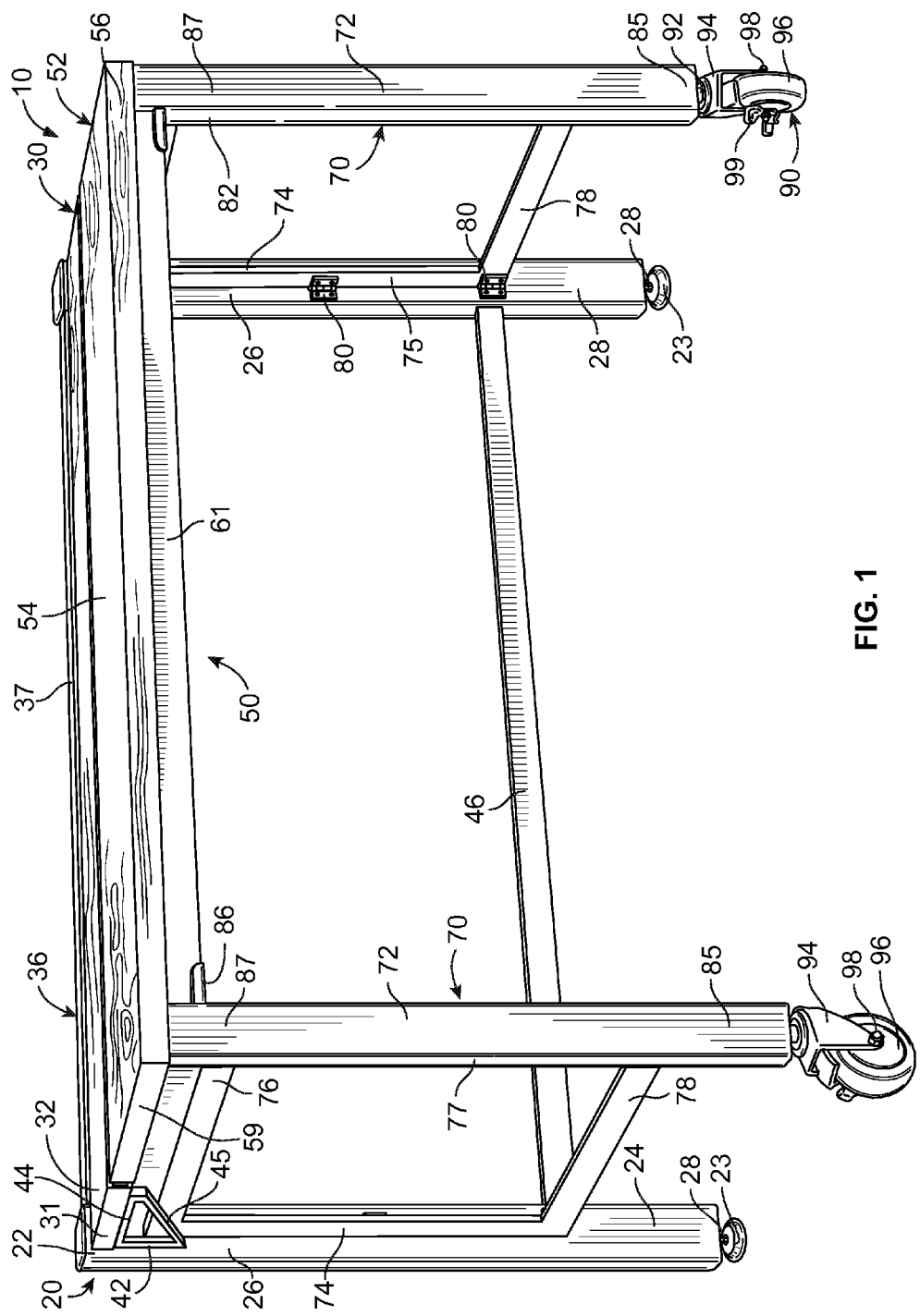
FIG. 1 is a front perspective view of the main embodiment of the present invention in the operating or working position.

Referring now to FIG. 1, the collapsible workstation of the present invention will generally be identified by reference numeral 10. The preferred configuration of the workstation 10 generally includes three subassemblies: (1) a stationary base subassembly 20; (2) a collapsible work surface or table subassembly 50; and (3) at least one movable front leg subassembly 70.

The collapsible workstation stationary base subassembly 20 comprises at least two stationary back legs 24, with the back legs 24 having a capability of being firmly attached to a wall or other stationary object (not shown), thereby rendering at least the stationary base subassembly 20 immobile relative to the floor and wall, while permitting the other two subassemblies 50, 70 to be movable relative to the stationary base subassembly 20. Stationary base subassembly 20 may comprise additional stationary vertically extending back legs; however for ease in installation and for maintaining costs to a minimum, two stationary back legs 24 are preferred. The width in the lateral direction of the stationary back legs 24 is sufficient to stabilize the structure and also to provide an attachment to the at least one movable front leg subassembly 70, as will be described below.

Stationary base subassembly 20 further includes a stationary top 30 having a top surface 32 and a bottom surface 34 (FIGS. 7 and 8) which top 30 is attached to a vertically upward end 22 of the back legs 24. The stationary back legs 24 extend in a vertical direction to the end 22 which is disposed at a position so as provide a desired height to the stationary top 30. An upper support cross bar 36 extends between the upward ends 22 of the stationary back legs 24 to provide a sturdy and rugged structure to the stationary Each stationary back leg 24 is connected by appropriate attachment means (discussed in greater detail below) adjacent the longitudinal end of the stationary top 30. While the upper end 22 of legs 24 are shown as extending above the level of the top surface 32, it should be appreciated that a modification easily may be made to provide for a top surface 30 that is either coterminous with, or extends above, the upward end 22 of the back legs 24. Additionally, the back legs 24 may extend in the lateral direction completely to the wall to which the stationary base subassembly 20 will be attached upon installation. Appropriate plural connector attachments are provided, such as screws or bolts 25, which connect to the wall against which the workbench 10 will be disposed.

Figure 8:
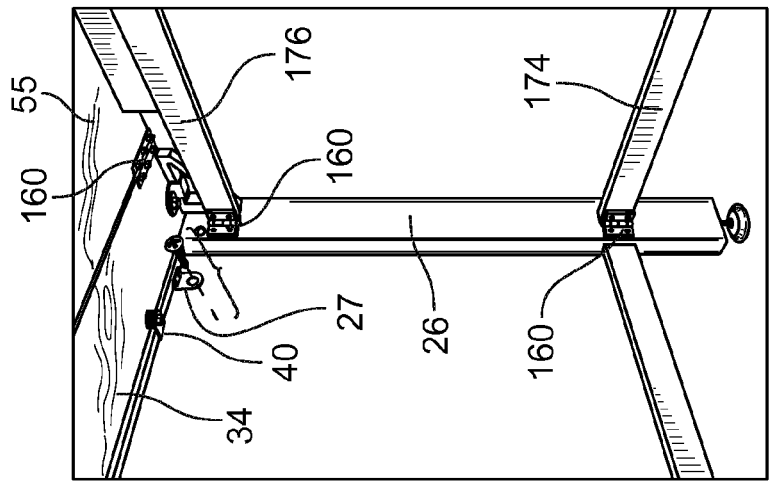
FIG. 8 is a detail perspective view of another alternative embodiment of the moveable back leg subassembly showing the attachment of the moveable leg to the stationary base.
Figure 7:
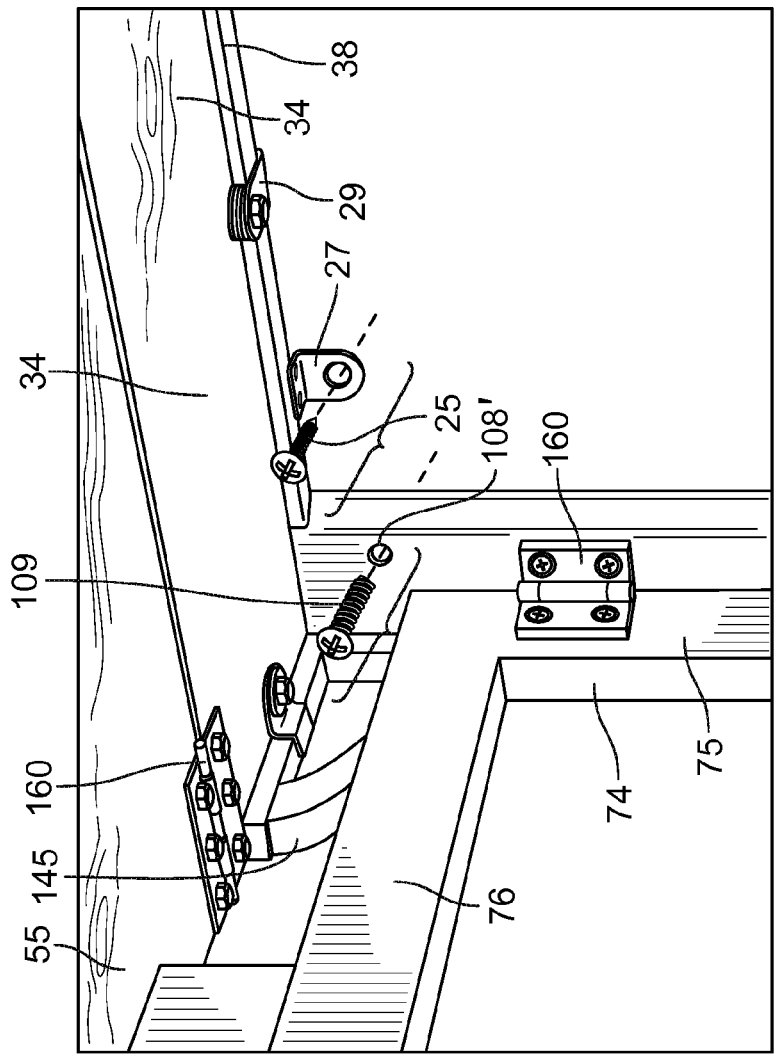
FIG. 7 is a detail view of the present invention illustrating the connections between elements and illustrating another embodiment of the stop bracket.

Referring now to FIGS. 7 and 8 in conjunction with FIG. 1, the bottom surface 34 of the stationary top 30 ideally is supported by an upper support bar 36 extending along its length in the longitudinal direction from the upper end 22 of one back leg 24 to that of the other back leg 24. The upper support bar 36 preferably is made of metal, as are the legs 24. The upper support bar 36 comprises an L-shaped (in cross-section) configuration with a vertically extending back 37 and a horizontally extending longitudinal beam 38 (FIG. 7) that is transverse to the back 37. As can be seen in FIG. 7, the longitudinal beam 38 supports the bottom surface 34, and thus by extension, the complete top 30 to the cross-bar 36. To provide additional stabilization to this connection, the upper support bar 36 includes horizontally extending bracket tabs 29 that attach to the bottom surface 34 of the stationary top 30 by an appropriate means, such as screws or bolts screwed into the bottom surface 34, as shown. Additional attachment mounts 27 may extend vertically from the horizontally extending longitudinal beam 38 so as to provide an attachment mechanism for screws or bolts 25 to attach the upper support bar 36 to a wall, as shown in FIGS. 7 and 8. The upper support bar 36 may be L-shaped (in cross-section) and, as shown in FIG. 1, the vertically extending back 37 can extend upwardly behind the stationary top 30 to the level of the top surface 32 or higher if a backsplash is desired.

Additional connection and support between the stationary back legs 24 and the stationary top 30 is provided by stop brackets 40, which serve a dual function. An upper portion of the back legs 24 provide a front-facing surface 26, supporting a triangular stop bracket 40 having two arms 42, 44 connected to each other at a right angle connection and at the other ends of arms 42, 44, connected to each other by a hypotenuse crossbeam 45. Arm 42 is connected to the front-facing surface 26 and arm 44 is connected to the bottom surface 34 at lateral ends of the stationary top 30 adjacent the surfaces 26. The hypotenuse crossbeam 45 connects the two ends of the arms disposed away from the right angle connection and provides upward support thereto to maintain the stability of the workstation device 10 when deployed in the working position (FIG. 1), and, with the horizontal beam 38, provides support to the top stationary 30 in an upwardly direction. Additionally, as described below, stop brackets 40 provide a stop position for the pivotable front leg assemblies 70.

To provide additional stability to the structure, the stationary base subassembly 20 includes an optional, but preferred, anterior support crossbar 46 that, in conjunction with the upper support bar 36, provides a more rugged structure as the support bars 36, 46 work together to maintain structural rigidity of the workbench 10. The anterior support crossbar 46 is attached to the stationary legs 24 by either welding or other appropriate attachment. The support bar 46 is preferably positioned closer to the opposite end of legs 24 than to the end to which the crossbeam or upper support bar 36 is attached, but the position is preferably away from the floor.

Figure 4:
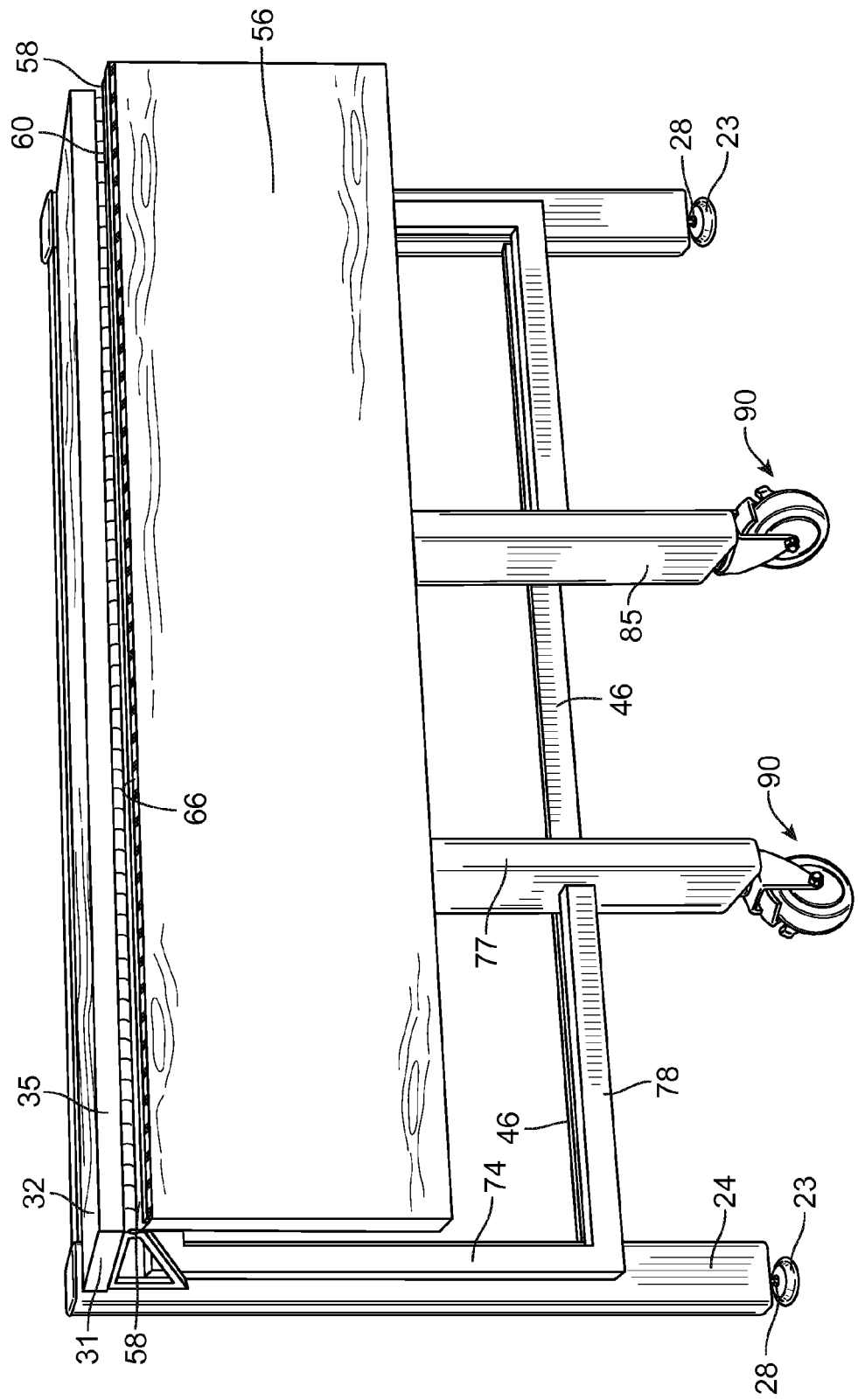
FIG. 4 is a front perspective view of the main embodiment of the present invention in the storage position.

Stationary top 30 is generally rectangular in shape, having a planar top surface 32 and bottom surface 34 with a front edge 35 (FIGS. 4 and 5), back edge 33 (FIGS. 5 and 6), and side edges 31. The front edge 35 and back edge 33 are uniform in length, as well as the side edges 31. Generally, the front edge 35 and back edge 33 are substantially longer than the length of side edges 31. The width of stationary work surface 32 is preferably a few inches in width, preferably between 3 inches and 12 inches in the transverse direction, that is, the direction extending out of the plane of the wall and perpendicularly away from the upper portion 22 of legs 24. More preferably, the width dimension of surface 32 is about 5-9 inches and most preferably approximately 7 inches. The width of stationary work surface 32 can be slightly more than the width dimension of workstation 10 when workstation 10 is in the storage position (as seen in FIG. 4). That is, the width (when stored) of the movable front leg assembly 70 will be less than the width of the stationary work surface 32 so that when the movable leg subassemblies 70 are stowed in the storage position, as shown in FIGS. 4, 5 and 6, they do not protrude beyond the front surface 35. When installed, stationary work surface 32 is oriented in its longitudinal direction along a wall when the device 10 is attached thereto.

The stationary top subassembly 20 provides a suitable work top surface 32 at a suitable distance above the floor for a user of the workstation 10 to be able to use it effectively. The preferred distance may be from about 3 feet to 4½ feet depending on the height of the worker, but 3½ feet above the floor on which the workstation is resting provides a workable standard. The height may be made adjustable, and as illustrated, is adjustable to some degree. To provide a good support interface between the floor and the stationary top subassembly 20, each back leg 24 has a leveler 23 extending downwardly from the bottom end of each leg 24, that is, the end that is opposite the upper end 22. Leveler 23 may comprise any known leveler, or may be a threaded post 23 that can screw into the leg 24 to adjust the height after the subassembly 20 is attached to the wall by the use of tabs 27 and screws 25, as described above. Since during normal operation, stationary base subassembly 20 is attached to a wall, legs 24 using levelers 23 provide for vertical support so that the wall does not bear the full weight of the subassembly 20.

As mentioned above, inventive workstation 10 compromises a second subassembly, that of the pivotable or collapsible work surface or table subassembly 50, which provides the major work surface 54 for workstation 10 when it is being utilized and is in the operating or working position, as shown in FIG. 1. Work surface 54 of table subassembly 50 comprises a number of members, the main one of which is the collapsible top 52. Like stationary work surface 32, collapsible top 52 is also generally rectangular in shape, the generally planar top work surface 54 providing for the pivotable or collapsible work surface 54 of the workstation. Top work surface 54, together with a bottom surface 55 generally parallel to the top work surface 54, define the thickness or depth of the collapsible top 52. Top 50 further comprises a first or front facing longitudinal edge 56, a second or back facing longitudinal edge 58 (FIGS. 4 and 5) and side edges 59 which together define the rectangular collapsible top 52. The length and thickness dimensions of the collapsible top 52 are preferably identical to those of stationary top 30, and these two members preferably comprise identical materials. As can be seen from the various views and embodiments, the width of the pivotable surface 54 is considerably longer than the width of stationary surface 32 by a factor of between 2 and 10. That is, the width is between about 15 to about 36 inches, and more preferably between about 24 to about 30 inches.

The front facing longitudinal edge 56, back facing longitudinal edge 58, and side edges 59 also define the working surface 54. The front edge 56 and back edge 58 are uniform in length, and the side edges 59 are of uniform and identical dimension, albeit significantly shorter than the dimensions of the front and back edges 56, 58. Generally, the front edge 56 and back edge 58 are substantially longer than side edges 59, but are approximately the same dimension as the front edge 35 (FIG. 4) and back edge 33 (FIGS. 5 and 6) of stationary top 30. The depth or thickness of collapsible top work surface 54 is such that the user would have satisfactory space to perform desired tasks on the working surface 54. The thicknesses of tops 32 and 50 should be in a range from about ½ inch to about 1½ inches, but should have a sufficient thickness to provide stability and durability for heavy duty use for a variety of robust and repeated uses.

Collapsible top assembly 50 includes a second rigidizing member comprising an anterior support cross-bar or slat 61 that supports the front edge 56 of the collapsible top 52. Rigidizing member 61 ideally takes the form of a longitudinal slat 61 attached to the bottom surface 55 adjacent to, but preferably not contiguous with, the front edge 56. The length of slat 61 is less than the longitudinal dimension of the collapsible top 52 for reasons that will be described below, and the side edges 62 should provide about a three inch offset from either of the side edges 59. The other dimensions, that is, width and thickness of slat 61 should be sufficient to provide sturdy support to the front portion of the surface 54 during robust use of the workstation 10. Ideally, the thickness surface 64 (as shown in FIGS. 2 and 3) should be at least one inch, and the width that is, the dimension in the direction perpendicular to the bottom surface 34, should be at least an inch or two to about four inches.

The front surface 35 of stationary top 30 is attached to back surface 58 of collapsible top 52, by a suitable attachment, such as a hinge 60 (FIG. 1), or hinge 160 (FIGS. 7 and 8). Ideally, the hinge is attached to bottom surfaces 34 and 55 by suitable connectors such as screws, as shown in FIGS. 7 and 8, leaving a small gap between the longitudinally extending front edge 35 of stationary top 30 and back edge 58 of collapsible top 52. The significance of the gap is described below. Hinge 60, and hinges 160 (FIGS. 7 and 8), form a connection axis connecting the bottom surface 34 of the stationary work surface 32 to the bottom surface 55 of the collapsible work surface 50, which is generally parallel to the wall where the workstation 10 is attached and also parallel to the floor.

It should be noted there that hinge 60 (FIGS. 1 and 4) is a single, continuously extending hinge that extends completely all along the side edges 31, 59. However, hinge 160, in an alternative embodiment shown, for example, in FIGS. 2, 3, 7 and 8, is disposed only at discrete points along the longitudinal edges of surfaces 35, 58, together providing for a single pivot axis about which the collapsible top 52 can pivot relative to stationary top 30.

Figure 2:
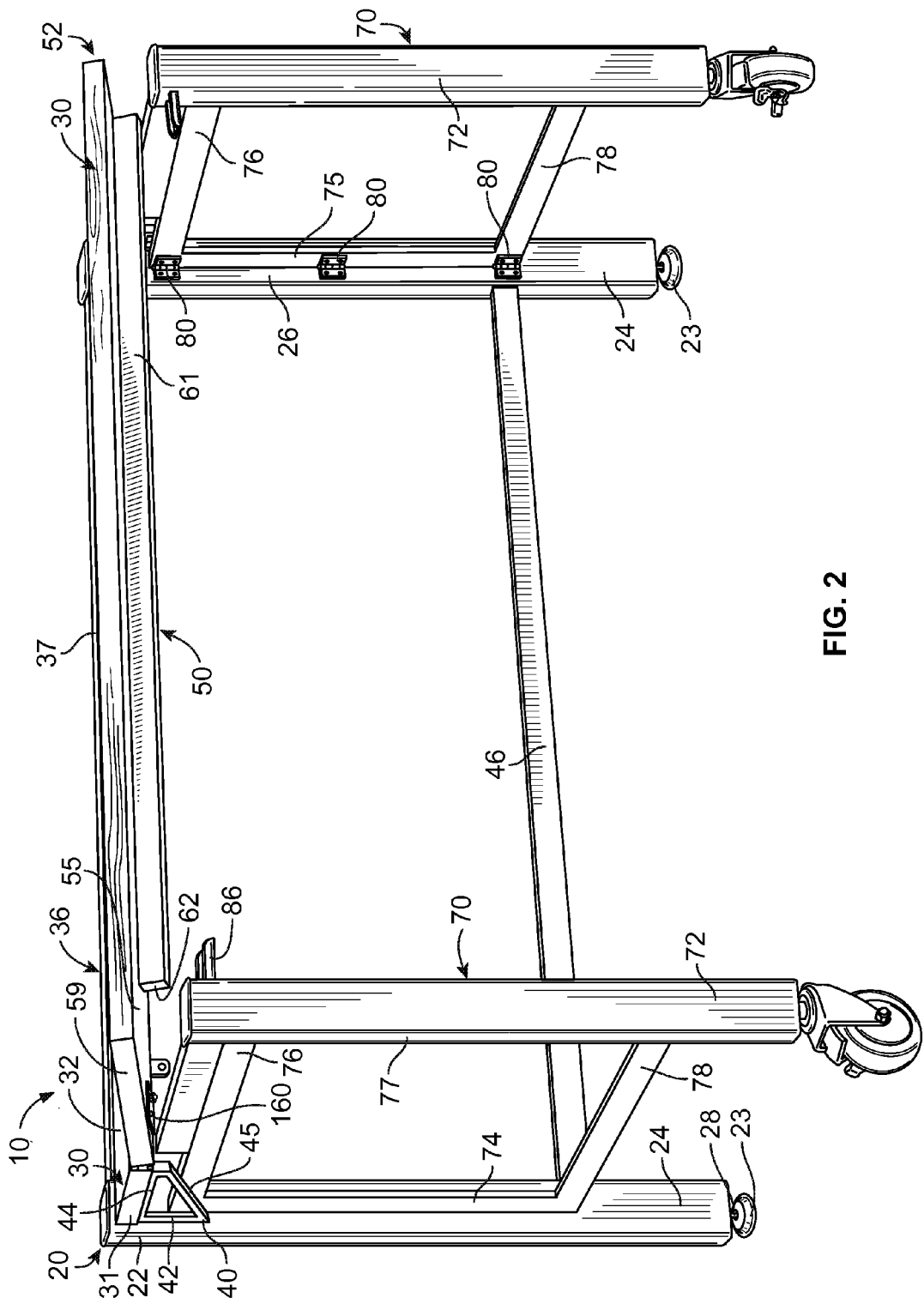
FIG. 2 is a front perspective view of the main embodiment of the present invention illustrating the collapsible worktable having a working surface in a slightly elevated position.
Figure 3:
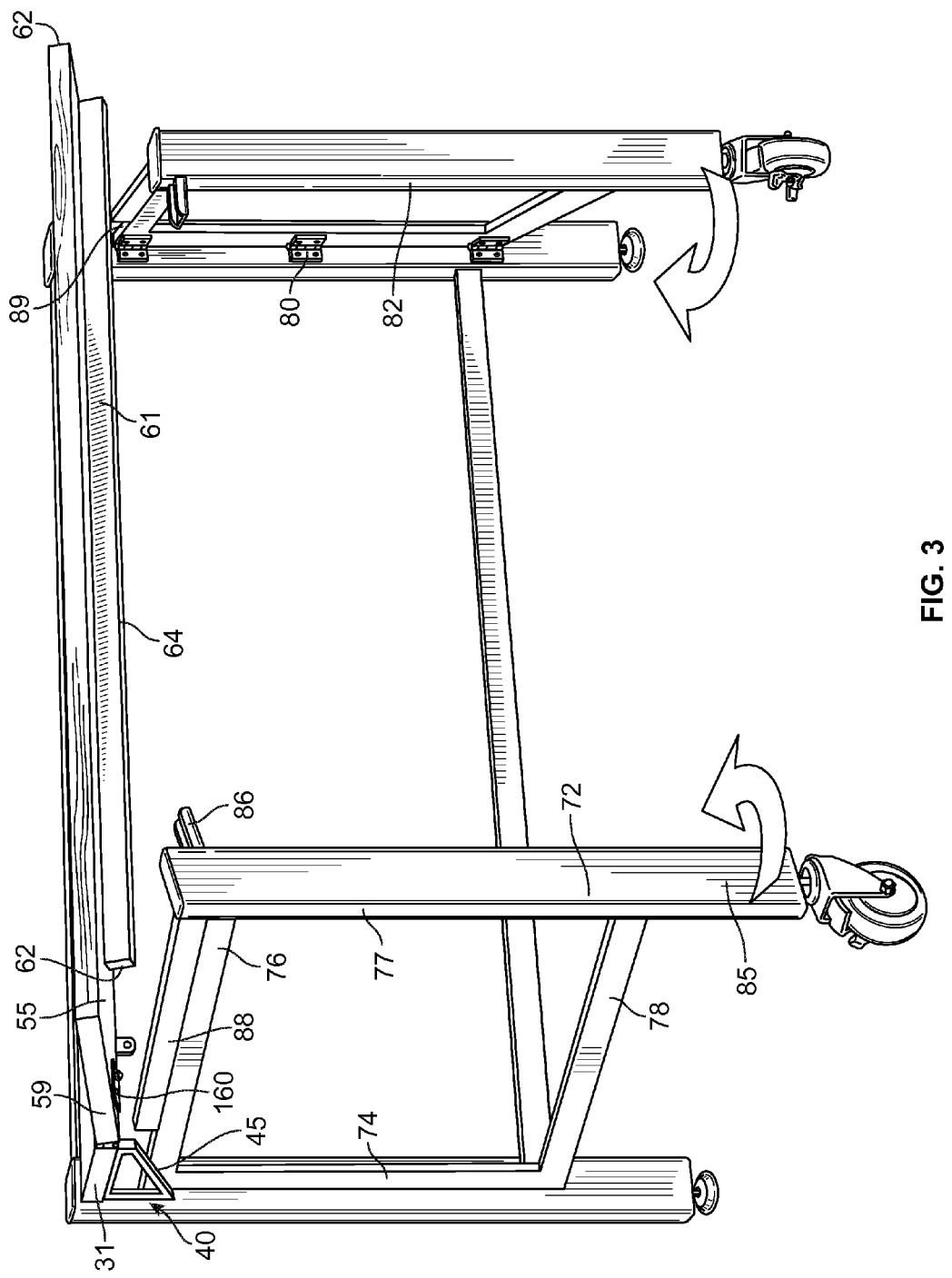
FIG. 3 is a front perspective view of the main embodiment of the present invention with the collapsible work surface in an elevated position illustrating the ability to pivot the moveable front legs.

When the collapsible top 52 is in the working or horizontally extending position, the back surface 58 is spaced from the front surface 35 of the stationary top 30 by a sufficient distance, between about ⅛ and ⅜ inches, providing for the pivoting about the hinges 60 or 160 of the collapsible top 30 upwardly for just enough distance, as shown in FIG. 2, to permit sufficient clearance to the slat 61 to enable the at least one movable front leg subassembly 70 to move in the direction of arrows (FIG. 3) to a stowed position where in the movable front leg assemblies 70 are disposed underneath the stationary top 30. When in the stowed position, the collapsible top 50 can be pivoted downwardly around the hinges 60, 160 so that it depends from the front edge 35 of stationary top 30 (FIG. 4) and retains the assemblies 70 in a compact and out of the way location.

When in the use position, that is, when the top surfaces 32, 54 are contiguous, and form a single worksurface, the gap presents a break in the continuous plane defined by the worksurface. To avoid anything falling into this gap, and also to avoid pinching of the user's fingers when the collapsible top 52 is being pivoted upwardly, a strip 66 (FIG. 4) comprising an elastomeric material, such as rubber or foam, is disposed all along the surface 58 from one side edge 59 to the other edge 59. In the preferred embodiment, the small gap would be fitted with a flexible member, such as an elastomeric strip 66, to prevent anything, such as fingers, from being pinched in the small gap when the collapsible top 52 is raised causing the top of the gap to narrow, as shown in FIGS. 2 through 6.

The thickness of the elastomeric strip 66 should be just slightly greater than the width of the gap between front surface 35 and back surface 58 so that when in the working position, the strip 66 just fills the gap, that is, does not protrude excessively above the contiguous plane, and does not permit anything to be inserted therebetween. However, because of its elastomeric properties, when the collapsible top 52 is raised upwardly (FIG. 2), the elastomeric strip 66, which comprises an incompressible material, will expand above the plane defined by the stationary top work surface 32, and thus permit the elevation of the front of the collapsible top 52 so that the required clearance is obtained.

The preferred embodiment of the present invention further includes at least one movable front leg subassembly 70 that provides upward horizontal support for the collapsible top 52 when it is in the open or working position, as shown in FIG. 1. Although one movable front leg subassembly could reasonably suffice to perform this function, the preferred embodiment incorporates two moveable front leg subassemblies 70, as shown in all the Figures. Each moveable front leg subassembly 70 comprises a number of parts, including an essentially rectangular support structure comprising a vertically extending moveable front leg 72, a vertically extending back support bar 74, a horizontally extending upper support bar 76 and a second horizontally extending lower support bar 78. The horizontally extending support bars 76, 78 are connected at either end to one of the vertical members, that is, either to front moveable front leg 72 or to vertically extending back support bar 74, by an appropriate means, such as metal connectors or welds (not shown). For ease in identifying the surfaces, these have been identified by numerals. The vertically extending moveable front leg 72 comprises, when in the working position (FIG. 1), a front surface 72, an inner side surface 82, an outer side surface 77 and a lower front bottom portion 85. Similarly, vertically extending back support bar 74 includes an inner surface 75. To provide additional upward horizontal support to the collapsible top 52 when the workstation 10 is in the working position, a second horizontal crossbeam 88 may be arrayed along the upward surface 89 of the horizontally extending upper support bar 76, which also engages the surface 55.

Each moveable front leg subassembly 70 is attached to stationary base subassembly 20 by at least two moveable leg hinges 80. One end of each hinge 80 is preferably attached to a front facing surface of stationary back leg 24, and the other end of hinge 80 is connected to the inner side surface 75 of the vertically extending moveable front leg 72, with the axis of the hinge extending vertically to permit pivoting of the leg assembly 70 therearound. Moveable leg hinge 80 allows each moveable front leg subassembly 70 to pivot around the essentially vertical connection axes defined by at least two adjacent moveable leg hinges 80 (as best seen in FIG. 3) that are attached in line to each stationary back leg 24. If more than two hinges 80 are used, then the axes of all of the hinges 80 should extend in line along a single axis of rotation. It should be also mentioned that all of the axes around which hinges 80 rotate are parallel to each other and to the wall to which the workstation will be attached.

Each moveable front leg subassembly 70 further comprises a bar support cup 86 attached to the inner side surface 82 of the front leg 72 for receiving the anterior support crossbar or slat 61, which is attached to the bottom surface 55 of collapsible top 52. As best seen in FIGS. 2 and 3, bar support cup 86 is attached to an upper portion 87 of the leg 72 and includes a slot defined by a U-shaped cup 86 that is wide enough to receive a crossbar 61 having a predetermined width, which is wide enough to provide robust support to the front edge 56 of top 52. The point of connection of cup 86 to the side surface 82 is just below the upper end of the legs 72, so that when the collapsible top 52 is placed over the movable legs 72, the crossbar 61 fits into the receptacle provided by the U-shaped sides, ideally such that collapsible top 52 comes to rest being supported by the upper portions 87 of legs 72 while simultaneously being supported by the crossbar 61 resting on the bottom surface of cups 86.

It should also be appreciated here that the cups 86 provide another significant function, in that they restrict the ability of the movable leg subassembly 70 to pivot once workstation 10 is engaged in the working position (FIG. 1). Hypotenuse crossbeam 45 of stop member 40 restricts continued pivoting of subassembly 70 in an outer direction beyond perpendicular to the stationary base subassembly 20, opposite to the arrow shown in FIG. 3. Once crossbar 61 is disposed firmly in place within cups 86, the combination of stop member 40 and cup 86 locks the position of movable subassembly 70 and does not permit motion of the subassembly 70 until the top 52 is lifted to unlock the collapsible top 52, thus to permit pivoting of movable leg subassemblies 70.

Additionally, in the preferred embodiment, each vertically extending leg 72 preferably includes casters 90 disposed adjacent the bottom portion 85 of leg 72. Casters 90 may be standard casters, such as those used in furniture, but are preferably suitable for heavy duty or even industrial type uses. Casters 90 may include standard parts, such as pin 92, housing 94, wheel 96 and axle 98, to permit the wheel 94 to rotate as the movable leg subassembly 70 is being pivoted, and a locking member 99. Casters 90 provide for ease of use and ability to pivot the subassembly 70 without experiencing excessive friction when dragging the movable leg subassemblies 70 across the floor. Nevertheless, despite the use of casters 90, the workstation 10 continues to provide robust support in keeping collapsible top 52 level during use (FIG. 1). Together with levelers 23, the installation of workstation 10 in a confined space can be effectively completed providing for attachment to a wall and to the user a sturdy and robust work space that can be stowed away when not in use.

As seen in FIG. 4 through FIG. 6, the pivoting nature of each moveable front leg subassembly 70 allows for stowing the workstation 10 into a closed or stowed position. Workstation 10 is moved into the stowed position, when workstation 10 is not in use and provides a space saving feature when space in a work area, such as a garage, is at a premium.

Stowing is fairly simple, and one significant feature that is enabled is that the user can complete stowing without requiring a second user to assist in the process. The basic process for stowing can be seen as one successively views FIGS. 1 through 6 when the drawing figures are viewed in order. FIG. 1 shows the working position, in which the collapsible top 52 is deployed and ready for work to be done on the top surfaces 54 and 32 of workstation 10 by the user. As can be seen, the collapsible top surface 54 is essentially contiguous with the stationary top surface 32, but includes a gap between longitudinal edges 35, 58 in which rubberized or elastomeric strip 66 provides a bridge to complete the working surface.

Stowing the collapsible surface so that it does not take up much room begins by lifting the front edge 56 or the crossbar 61 for a short distance and to an extent sufficient to provide clearance to the upper portion 87 of legs 72, as shown in FIG. 2. The gap between longitudinal edges 35, 58 is wide enough to provide sufficient room for the edges to approach each other without coming into contact as the edge 56 is raised. The strip 66 is resiliently compressed thereby to permit such clearance.

Raising the edge 56 unlocks the movable leg subassembly 70, which can then be pivoted about the axes defined by the hinges 80 in the direction of the arrow shown in FIG. 3. It should be noted here that the movable leg subassembly 70 can be pivoted only in this direction because the stop 40, and specifically the hypotenuse crossbeam 45, prevents pivoting of the leg subassembly 70 in the opposite direction.

When the movable leg subassembly 70 is pivoted to its complete extent, that is, either the inner surface 82 of the leg 72 engages the lower crossbeam 46, or the cup 86 engages the wall or a stop (not shown) on the wall, or the hinge ends of hinge 80 engage and stop further pivoting, or the side surface 82 of leg bottom portion 85 engages the lower cross-bar 46. Irrespective of the mechanism that stops the pivoting of subassembly 70, once subassembly 70 is stowed under the stationary top 30, the collapsible top 52 can be collapsed to its stowed position, as shown in FIGS. 4, 5 and 6. In this position, top 52 will be pivoted downwardly until surfaces 54 and 55 are parallel to the wall and essentially perpendicular to the floor. In this position, crossbar 61 may engage and come to rest against the outer surfaces 77 of the legs 72.

Figure 9A:
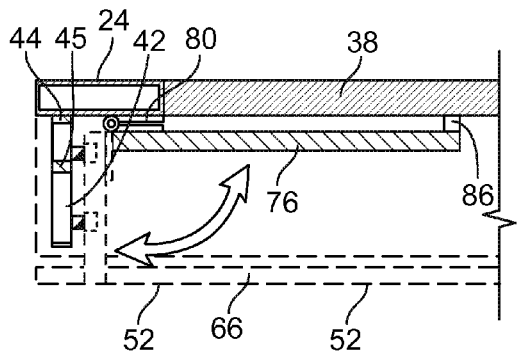
FIGS. 9A and 9B are top, cross-sectional views of alternative embodiment of the present invention illustrating an alternative hinge design for attaching the moveable front leg to the stationary base in the storage and operational positions, respectively.
Figure 9B:
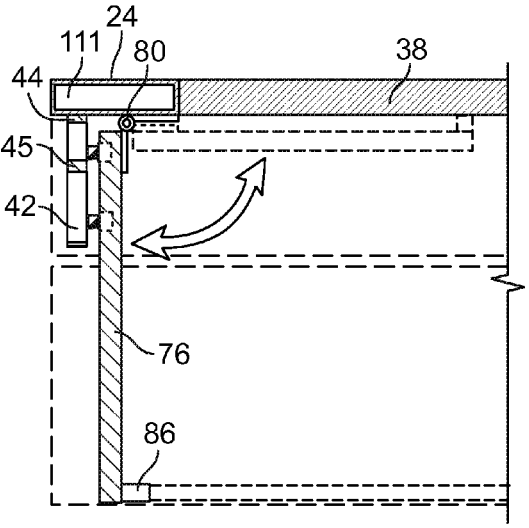

FIG. 9A and FIG. 9B, being cross-sectional views taken essentially along a plane parallel to the floor, illustrate the pivoting nature of each moveable front leg subassembly 70. Both FIGS. 9A and 9B illustrate the positions of the movable front leg subassembly 70, FIG. 9B in the open or working position, and FIG. 9A in the closed or stowed position. Stationary work surface 32 and collapsible work surface 52 are shown by long broken lines in FIG. 9B as extending parallel to the wall and in FIG. 9A as extending perpendicular to the wall. Furthermore, each moveable front leg 72 is indicated in cross-section, the cross-section being taken approximately just below surfaces 34, 55. The position for each moveable front leg assembly 70 is indicated through an outlined broken line from the position from which it has been moved. As can be seen, when in the stowed position (FIG. 9A), the lateral end of cup 86 extends beneath horizontally extending longitudinal beam 38.

In a second alternative embodiment as seen in FIG. 8, an alternative embodiment of moveable leg hinges 160 can be incorporated to attach the horizontal braces 174 and 176 directly to the surface 26 of the stationary legs 24, in effect eliminating the vertically extending back support bars 74 of the above described embodiments. These two flat members are connected in such a manner as to create a pivoting axis along hinges 160.

Figure 9C:
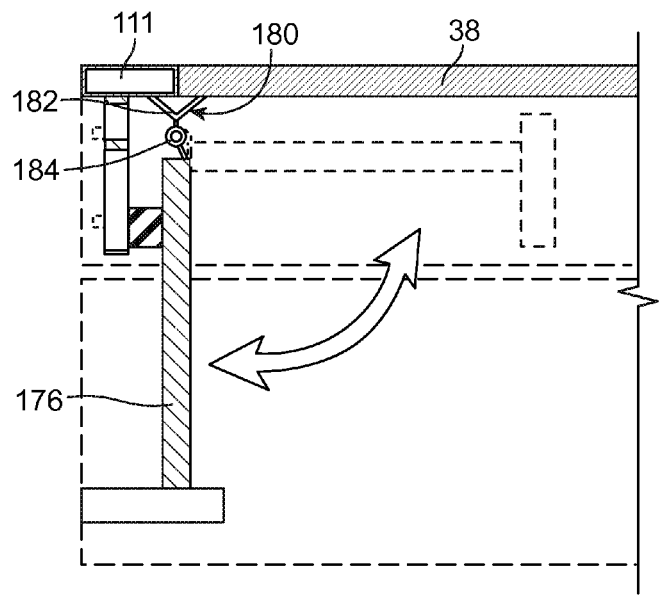
FIG. 9C is a top, cross-sectional view of yet another embodiment of the present invention illustrating an alternative hinge design for attaching the moveable front leg to the stationary base.

FIG. 9C illustrates an alternative moveable leg hinge 180, which can be utilized instead of hinge 80. This alternative hinge 180 features a triangular base 182 providing a connection to a stationary hinge pivot 184 around which a movable hinge element (not shown) can pivot and rotate. Triangular base 182 including stationary hinge pivot 184 attaches to stationary top subassembly 20. Likewise, movable hinge element 186 is attached to the horizontal braces 174, 176, one of which is visible in FIG. 9C. Pivoting of moveable leg hinge 182 allows each moveable front leg subassembly 70 to pivot about the hinge 180 into a desired position, either stowed underneath stationary top 32 or in the open position supporting collapsible top 52, as in FIG. 1.

When using the present invention, workstation 10 is intended to be mounted to a wall (not shown) through at least one wall mount attachment 27 (FIG. 7). Although, only one wall mount attachment 27 may be used, it is preferred to use at least two wall mount attachments 27 to provide a secure connection of the stationary top subassembly 20 to the wall. FIGS. 7 and 8 illustrate a wall mount attachment 27 used to mount workstations 10 to a wall are also securely attached to at least one element of the stationary top subassembly 20, in these views being the horizontally extending longitudinal beam 38.

Any of the above described embodiments can be utilized with one or more storage cabinets or shelves, as is described in greater detail below. For convenience, only the embodiment illustrated in FIG. 1 and described above will be shown and described with the use of the storage capacity modules. However, it should be recognized that the storage modules can be utilized with any of the other above described embodiments as well as with other table and workbench configurations, and indeed, may be separately attachable to a wall as a stand alone unit, all being alternative embodiments of the storage capacity features of this invention.

Figure 10:
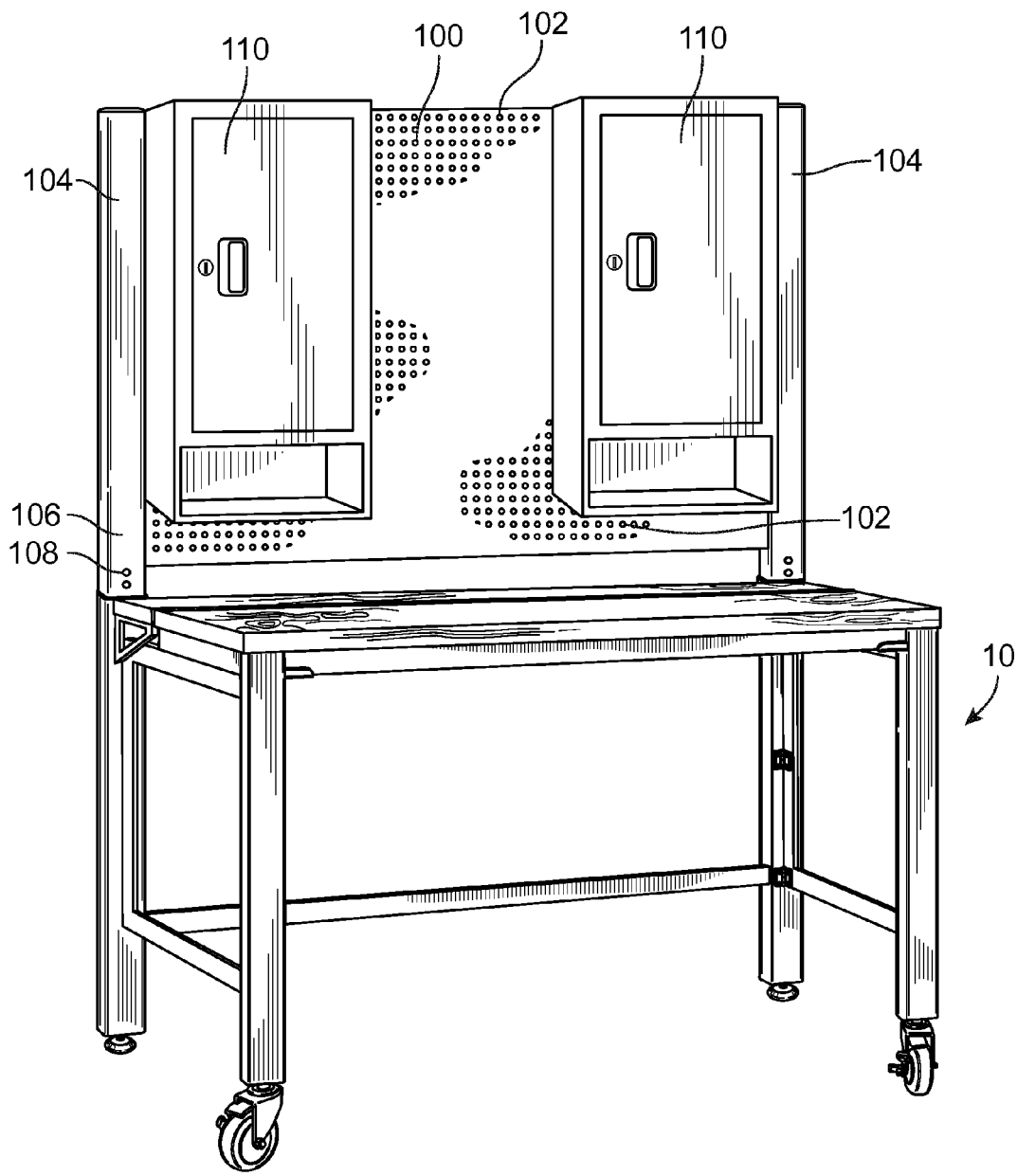
FIG. 10 is a front perspective view of an alternative embodiment of the present invention illustrating a first optional storage configuration attached to the stationary base of the workstation.
Figure 11:
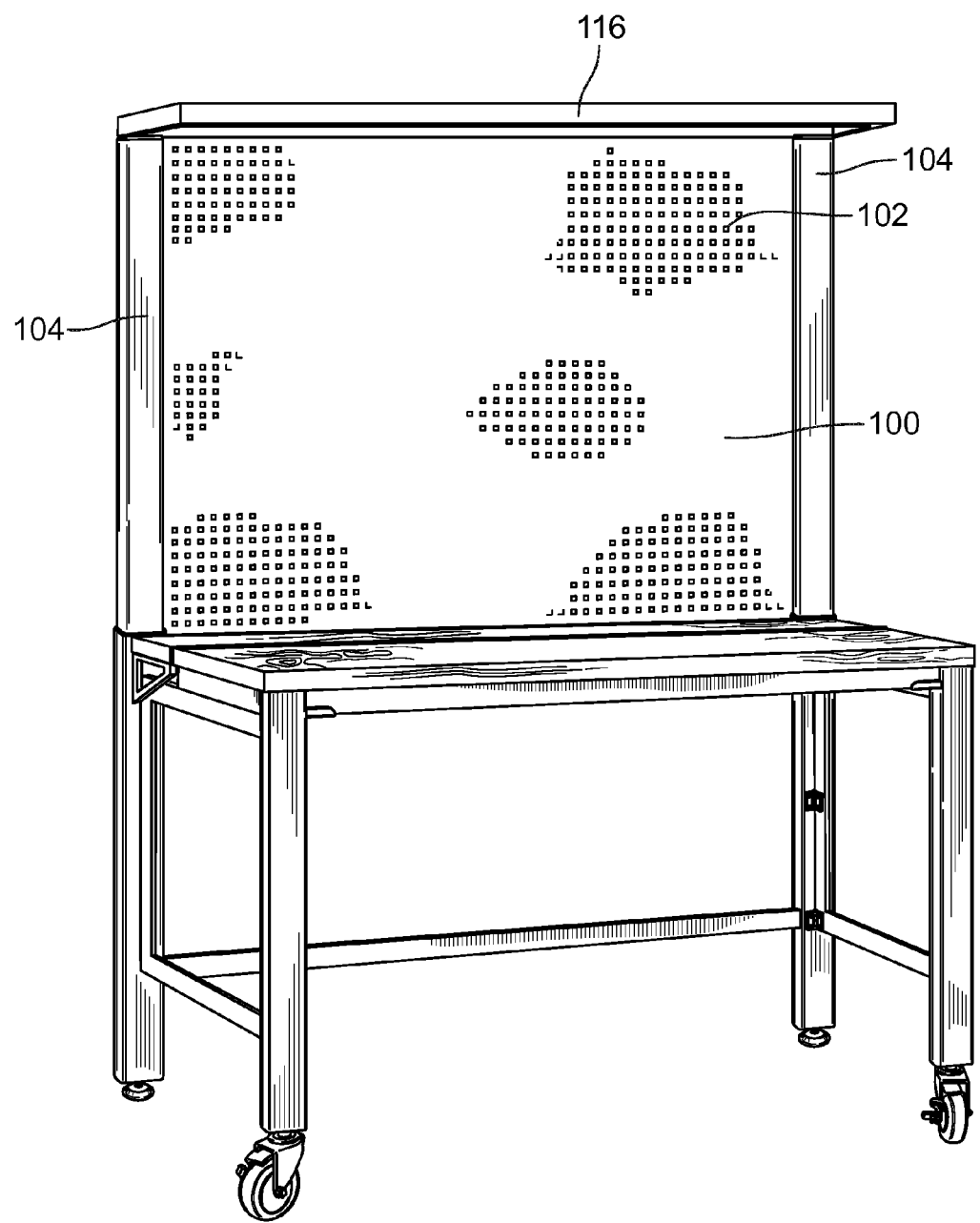
FIG. 11 is a front perspective view of an alternative embodiment of the present invention illustrating a second optional shelving configuration attached to the stationary base of the workstation.
Figure 12:
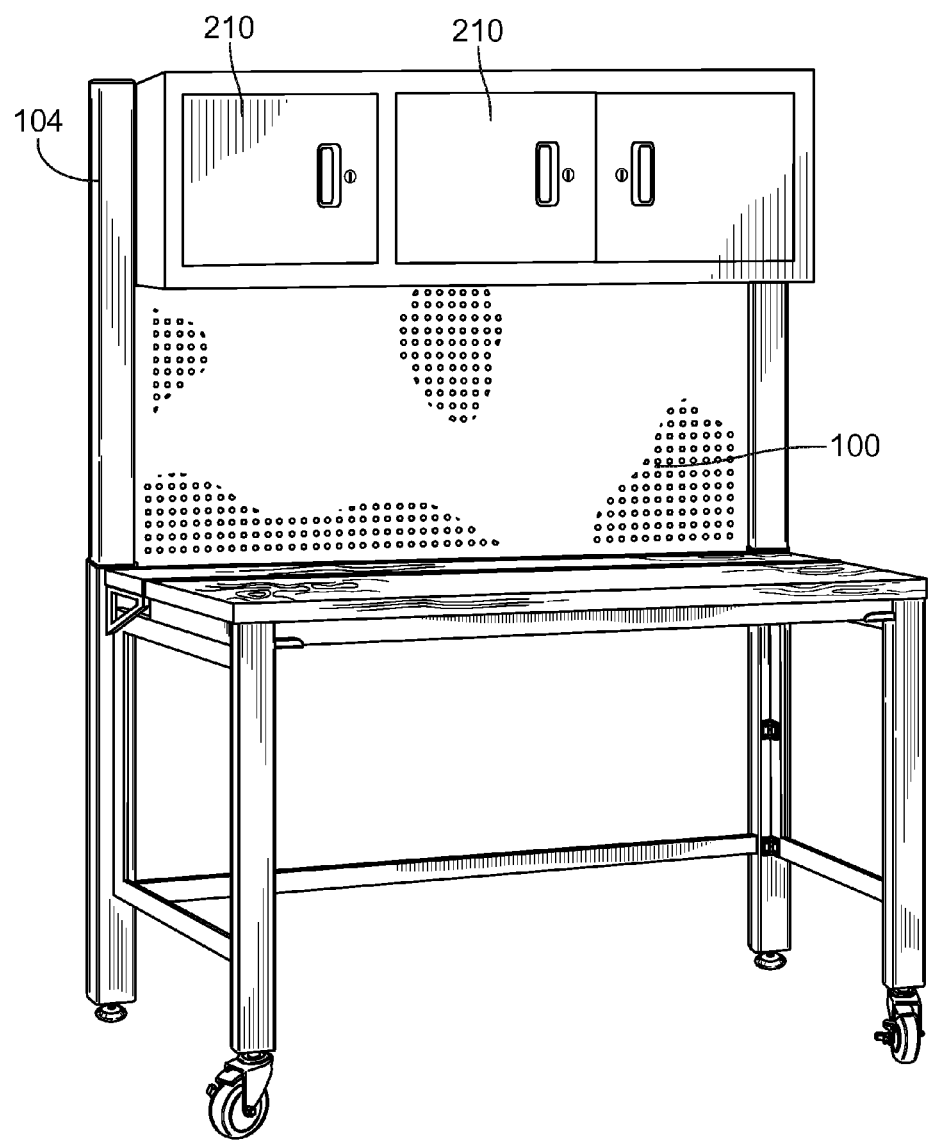
FIG. 12 is a front perspective view of an alternative embodiment of the present invention illustrating a third optional cabinet configuration attached to the stationary base of the workstation.

Referring now to FIGS. 10-12, several additional embodiments are shown in which a storage facility, for example, a shelf (FIG. 11) or cabinets (FIGS. 10 and 12) are attached to a workbench, for example, collapsible workstation 10. These generally include an optional and essentially planar back board member 100 extending in a longitudinal direction upwardly from the stationary top subassembly 20. As in standard tool storage regimes, spaced apart throughholes or perforated apertures 102 are spaced, oriented and configured to provide for a hook attachment (not shown) that can be attached therethrough, on which tools and other objects can be attached until needed. Throughholes 102 can also provide attachments to one or more cabinets 110, as shown.

Figure 14:
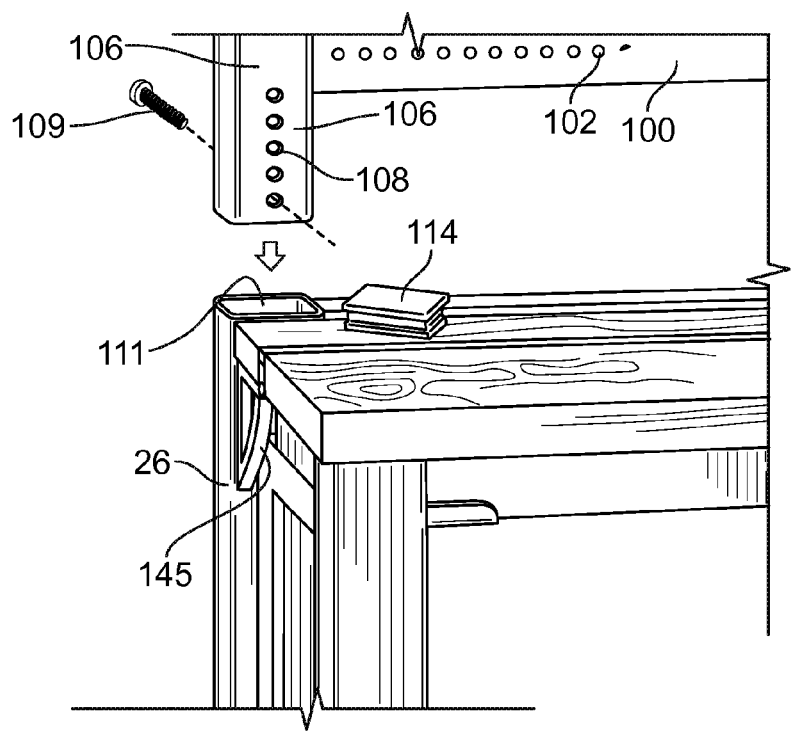
FIG. 14 is a detailed front perspective view of an alternative embodiment of the present invention illustrating the telescoping capability of the backsplash bars to provide varying vertical positions of the storage configuration.
Figure 16:
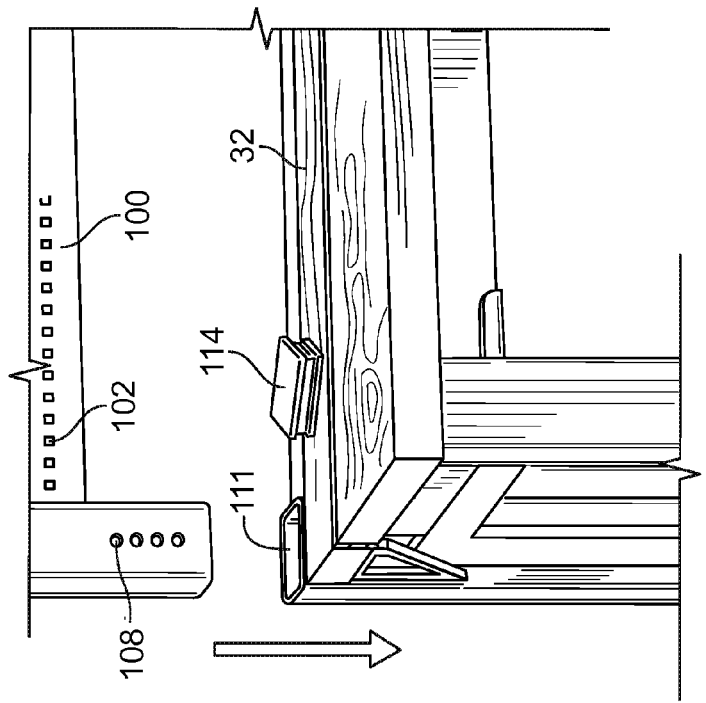
FIG. 16 is a detailed front perspective view of the alternative embodiment of FIG. 15.
Figure 15:
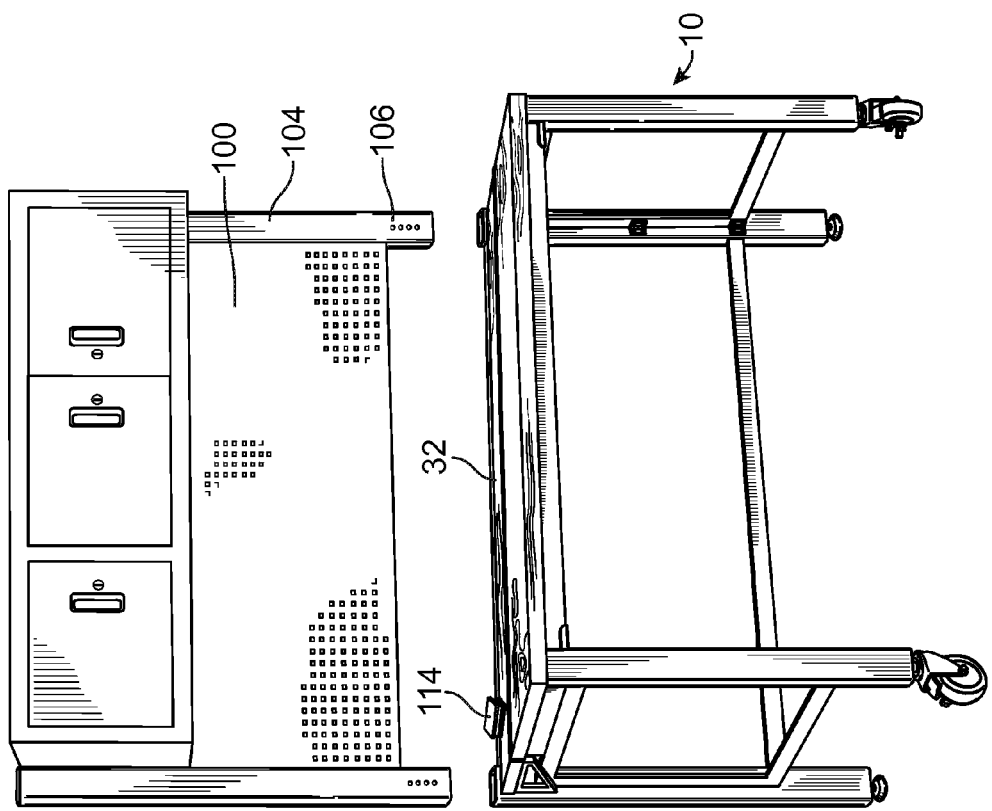
FIG. 15 is a front perspective view of an alternative embodiment of the present invention illustrating the telescoping capability of the backsplash bars to provide varying vertical positions of the storage capacity.

As is illustrated in FIGS. 10-12, the back board member 100 includes two vertical supports 104, one at each lateral edge of board 100. As seen in FIG. 10 and more clearly in the detail view of FIG. 14, back board member 100 is attached to the stationary top subassembly 20 at a lower end 106 of supports 104. To facilitate attachment of the vertical supports 104 to stationary top subassembly 20, a telescoping vertical receptacle 111 (FIG. 14) is defined by the walls of the upper stationary leg 26. Telescoping vertical receptacle 111 has internal dimensions just slightly larger than the outer dimensions of lower end 106 of supports 104, so that the supports 104 can be inserted therein in a telescoping arrangement, as shown in FIGS. 15 and 16. Thus, the vertical position of the board 100 and supports 104 can be adjusted vertically in the direction of the arrow.

In embodiments in which the back board 100 is not utilized, cover 114 (FIGS. 14 and 16) can be inserted into receptacle 111 to provide a closure to the receptacle 11 as a safety and convenience to the user. At such time as a back board 100 assembly is desired to be used with the workstation, the cover 114 can be removed and lower end 106 of support 104 can be inserted therein.

Support lower end 106 includes several lateral apertures 108 that extend throughout the supports 104 so that one or more pins 109 (FIGS. 7 and 14) may be inserted into a corresponding throughhole 108' (FIG. 7) disposed in the upper portion of the stationary legs 26. As the pin or screw 109 is inserted through both the throughholes 108 and 108', the pin or screw 109 attaches the support lower end 106 to the upper portion of leg 26 to lock in place the vertical position of the supports 104, and thus, of the complete storage assembly attached to back board 100. As can be seen from a comparison of the two view in FIGS. 7 and 14, in the FIG. 7 embodiment, the pin or screw is inserted from the workbench inner surface 26 of leg 24 toward the wall while in FIG. 14, the pin 109 is inserted from the back surface of leg 24 toward the front. If a screw 109 is used, it may have a means to puncture the wall surface behind of the wall to which workstation 10 is attached, thus providing a dual function of attaching the stationary subassembly 20 to the wall as well.

Because several throughholes 108 are arrayed vertically along the end 106, the vertical position of board 100 and associated storage facility may be adjustable to provide a desired height and clearance between the bottom edge of the board 100 and the stationary top 32. The process of 15 inserting the lower end 106 into the adjustable receptacle 111 to align the throughholes 108, 108', is seen more clearly in FIGS. 14-15. That is, the process is to remove the cover 114, and insert both of the lower ends 106 of supports 104 into the receptacles 111 and the apertures 108, 108' are aligned, allowing the pin 109 to be inserted into the apertures 108, 108' and affixed thereto either by screwing into the wall or by other appropriate means, such as a nut or a dowel pin. Another feature of the 20 embodiments shown in FIGS. 7 and 14 is the use of a rounded triangular stop (not shown), that has an outwardly or convex triangular segment 145 that extends further out than does the straight hypotenuse crossbeam 45 shown in FIGS. 1-4.

The embodiment shown in FIG. 10 includes a pair of cabinets 110 on each side of the perforated back board 100. The cabinets can be attached to the board 100 by means of connectors (not shown) that are inserted and connected through the apertures or perforations 102 in the board 100. Disposition of the cabinets 110 can thus be adjustable or varied both vertically and horizontally, as desired, leaving some room between them for storing tools or other objects, as shown.

The embodiment shown in FIG. 11 includes the back board 100 having throughholes 102 but rather than cabinets, it includes a top shelf 116 for storage of objects or ornamental features. The attachment of the shelf 116 to the board 100 may be through connectors attaching the lateral ends of shelf 116 directly onto the top ends of supports 104.

Another embodiment is shown in FIG. 12, which includes back board 100 and apertures or throughholes 102, but different from the embodiment of FIG. 10, includes cabinets 210 disposed along the upper edge of back board 100, as shown. Cabinets 210 thus provide both storage for objects and tools, and also provide a shelf configuration along their upper surface.

Figure 13:
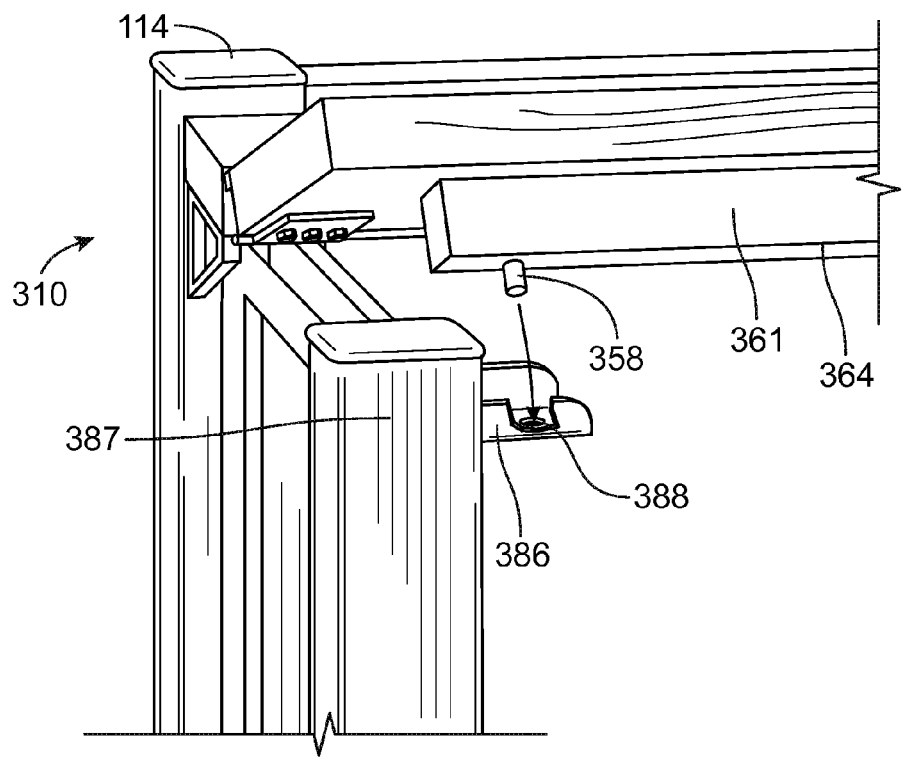
FIG. 13 is a detailed front perspective view of an alternative embodiment of the present invention illustrating the connection capability of the collapsible work surface to the movable leg assembly.

In workbench embodiment 310 shown in the detail view of FIG. 13, anterior support crossbar 361 further comprises at least one crossbar engagement pin 358. Although only one crossbar engagement pin 358 could be used, it is preferred to have two crossbar engagement pins 358, one at each end of the crossbar 361. Each crossbar engagement pin 358 would be positioned in such a manner to be received by a receptacle or vertically oriented aperture 388 disposed in a support cup 386 attached to the upper portion of the pivotable front leg 387.

This alternative embodiment would additionally require some alteration of each support cup 386 to enable each support cup 386 to receive the crossbar engagement pin 358. Such alteration could include the vertically oriented aperture 388 shown in FIG. 13, which would provide a secondary locking mechanism when the anterior support bar 361 engages the support cup 386. In another modification, rather than a vertically oriented aperture 388, a support cup dimple (not shown) could be pressed into the upwardly facing surface in the bottom of cup 386. In this case, rather than a crossbar engagement pin 358, the bottom surface 364 of the crossbar 361 can include a slight protrusion (not shown) that would engage the dimple to lock the cross bar 361 in place.

In a fourth alternative embodiment, anterior support crossbar can be designed to run the full length of collapsible work surface 50. To accommodate such an alternative embodiment, each moveable front leg 70 would be altered to have a vertically oriented aperture disposed at the upper end thereof designed to receive the additional length of anterior support crossbar.

The installation and use of workstation 10 is easily performed by a single user without necessitating the assistance of a second person. Beginning with the workstation 10 in the closed position (as seen in FIG. 4 through FIG. 6), the user will lift the collapsible work surface 52 in the upward direction (as seen in FIG. 2 and FIG. 3) to a slight angle. Upon lifting the collapsible work surface 52 to a slight angular position as permitted by the clearance of the gap, the user will outwardly pivot the of two movable front leg assemblies 70 until movement of the movable front legs 72 are restricted by the stop bracket 40 (as seen in FIG. 3). Once the movable front legs 72 are positioned at approximately right angles to the longitudinal dimension of the stationary top subassembly 20, the user can pivot or allow collapsible work surface 52 to fall in a downwardly direction until the crossbar 61 engages the bottom surface of cup 86.

To collapse the workstation 10, the user would merely need to lift slightly the collapsible work surface 50 in an upward direction and pivot the at least one movable front leg 70 inward in the direction of the stationary base 22 (as seen in FIG. 2 and FIG. 3). After the at least one movable front leg 70 is completed pivoted, the user may carefully drop the collapsible work surface 50 until it is perpendicular with the stationary work surface 32. Upon completion of dropping the collapsible work surface 50, the user has successfully collapsed the workstation 10 into the closed position (as seen in FIG. 4 through FIG. 6).

In a method of making the preferred embodiments of the inventive workstation 10 is to assemble the three subassemblies individually, and then assembling the subassemblies together. The method of making the stationary top subassembly 20 involves attaching each stationary back leg 24 to stationary work surface 32 by a single stop bracket 40, which is generally triangular in shape with each non-hypotenuse side being approximately the same in length. 5 As seen in FIG. 1 through FIG. 6, one non-hypotenuse side of each stop bracket 40 is attached to the upper portion of each stationary back leg 24, while the other non-hypotenuse side of each stop bracket 40 is attached to the bottom, outermost edges of stationary work surface 32. Furthermore, posterior bottom crossbar 46 is attached to the bottom portion of each stationary back leg 24, as seen in 10 FIG. 6. Posterior top crossbar 36 attaches to the upper portion of each stationary back leg 24.

As seen in FIGS. 7 and 8, each wall mount attachment 27 is attached to the bottom, horizontally extending longitudinal beam 38 of stationary work surface 32. Each wall mount attachment 27, regardless of number, is spaced in an appropriate manner to provide sufficient support when workstation 10 is mounted to a wall. Wall mount attachment 27 can take various forms in design and material, such as a strong polymer or preferably a sturdy metal clip.

The method of making collapsible top subassembly 50 involves attaching collapsible work surface 52 to stationary work surface 32 by means of collapsible work surface hinge 60. Collapsible work surface hinge 60 can take various forms of design, such as running the entire length of the collapsible work surface or an array of smaller hinges, as described above, as long a the axis of the hinges are co-extensive. As seen in FIG. 4, collapsible work surface hinge 60 is attached to the bottom, front edge 35 of stationary work surface 32 and the bottom, and to back edge 58 of collapsible work surface 52. Furthermore, the gap created between back edge 58 of collapsible work surface 52 and stationary work top 32, as discussed previously, is preferably filled by flexible strip 66, such as an elastomeric or rubberized seam. As seen in FIG. 1, anterior support crossbar 61 is attached to bottom, front edge 56 of collapsible work surface 52.

The method of making moveable front leg 70 subassembly involves attaching each moveable front leg 70 to each corresponding stationary back leg 24 by means of moveable leg hinges 82. Support cup 86 is attached to each moveable front leg 70 individually, 5 in a manner that will allow each support cup 86 to receive anterior support crossbar 61. Furthermore, casters 90, or the like, are attached to the bottom of each moveable front leg 70 to provide ease of use.

The materials used for the various elements can be any appropriate materials that are conventionally used for workbenches. For example, the tops 32 and 52 may preferably comprise 10 a wood block, pressed wood, plywood, hard plastic or metal material that provides a good work surface for the workstation. The other elements are preferably made from an appropriate metal, such as stainless steel, that is durable in heavy duty use, but not so expensive as to render the workstation unaffordable to most homeowners.

The invention has been described and illustrated with reference to the embodiments of FIG. 1 through FIG. 16, but it should be understood that the features and operation of the invention as described is susceptible to modification or alteration without departing significantly from the spirit of the invention disclosed above. For example, the dimensions, size and shape of the various elements may be altered to fit specific applications, as has been shown in the modification of stop member 140 (FIGS. 7 and 14) to have a rounded, (rather than straight) hypotenuse member 145. Other modifications are also possible, for example having the collapsible top 52 having a front surface that is rounded, so that collapsible top 52 is in the shape of a half moon. Accordingly, the specific embodiments illustrated and described herein are for illustrative purposes only and the invention is not limited except by the following claims.

What is claimed is:

1. A workstation capable of being mounted to a wall, comprising:
    a stationary base subassembly including:
        at least two stationary back legs,
        at least one wall mount attachment for attaching the stationary base subassembly to a wall,
        a stationary top essentially rectangular in shape, having a planar top surface and a bottom surface, a longitudinally extending front edge, a longitudinally extending back edge, and transversely extending side edges, the stationary top being oriented in its longitudinal direction to extend along a wall when attached thereto, and
        at least one stop bracket attaching the bottom of the stationary top to one of the at least two stationary back legs;
    a collapsible top subassembly including:
        a collapsible work top having a planar top surface and a bottom surface, a front edge, and a back edge, the dimensions between the front and back edges of the collapsible work top being substantially larger than the dimensions between the front and back edges of the stationary work surface, the collapsible top further including:
            a collapsible work surface hinge having a horizontally extending axis, the hinge connecting the stationary top to the collapsible top, thereby enabling the collapsible work top to pivot about the hinge axis relative to the stationary top; and
            an anterior support crossbar attached to the collapsible top bottom surface disposed adjacent the front edge thereof;
    at least one movable front leg subassembly, each movable front leg subassembly including:
        at least one movable leg hinge attaching the at least one movable front leg subassembly to the stationary base,
        a pivotable leg, disposed away from said at least one movable leg hinge, capable of pivoting about said at least one movable leg hinge; and
        a support cup having two upstanding walls and a bottom surface for receiving the anterior support crossbar when the workstation is in the open position,
    wherein said stop member is configured and oriented to restrict continued pivoting of the movable leg around the movable leg hinge in an outer direction beyond perpendicular to the longitudinally extending front edge of said stationary top,
    whereby positioning the movable leg subassembly to an open position wherein the movable leg is furthest from the stationary base permits engagement of the anterior support crossbar with the support cup.

2. The workstation according to claim 1, wherein the support cup bottom surface anterior includes a receptacle, and the support crossbar further comprises a crossbar engagement pin attached to the bottom surface of the anterior support crossbar, the pin being shaped dimensioned and oriented so as to be received by the receptacle disposed in the bottom surface of the support cup.

3. The workstation of claim 2, wherein the support cup further comprises a support cup dimple for receiving the crossbar engagement pin.

4. The workstation of claim 2, wherein the support cup further comprises a support cup aperture for receiving the crossbar engagement pin.

5. The workstation of claim 1, wherein the at least one movable front leg further comprises a movable front leg support bar oriented vertically attached to the back of the at least one movable front leg and connected to the stationary back legs by at least one movable leg hinge.

6. The workstation of claim 1, wherein the workstation includes at least two movable front leg assemblies, and the at least two movable front legs each include at a lower portion thereof at least one caster.

7. The workstation of claim 1, wherein the at least two stationary back legs further comprises at least one stationary back leg vertical aperture positioned adjacent an upper portion of each stationary leg, the aperture being shaped, dimensioned and oriented to receive at least two support bars of a back board member.

8. The workstation of claim 7, wherein the at least two support bars further comprises an array of connection holes allowing the back board member to be inserted to a desired depth into the at least one stationary back leg vertical aperture the workstation further including a connection pin for insertion into each connection holes thereby to permit the support bars to have a telescoping relation within the vertical apertures.

9. The workstation of claim 7, further comprising for each back leg vertical aperture a telescoping aperture cover shaped, dimensioned and oriented to be inserted into each stationary back leg telescoping aperture when no support bar is inserted therein.

10. The workstation of claim 7, wherein the back board member further comprises at least one cabinet attached thereto.

11. The workstation of claim 7, wherein the back board member further comprises at least one storage shelf attached thereto.

12. The workstation of claim 7, wherein the at least two support bars further comprise a perforated board having apertures for tool attachment.

13. A workstation for mounting to a wall, comprising:
a stationary base including connection members capable of connecting the stationary base to a wall, comprising:
at least two stationary back legs,
at least two wall mount attachments vertically positioned for attaching the stationary base to a wall,
a stationary work surface having an essentially rectangular shape, an essentially planar top surface and a bottom surface, a front edge, a back edge, and transverse side edges, such that the back edge would be oriented along the longitudinal direction to extend along a wall when the stationary base is attached thereto, and
at least one stop bracket attaching the bottom of the stationary work surface to an upper portion of one of the at least two stationary back legs, and extending below the stationary bottom surface;
a collapsible work surface rectangular in shape having a planar top surface and a bottom surface, a longitudinally extending front edge, a longitudinally extending back edge, and two transversely extending side edges, the dimensions between the front and back edges of the collapsible work surface being significantly larger than the dimensions between the front and back edges of the stationary work surface, the collapsible work surface further comprising
a collapsible work surface hinge having a connection axis connecting the bottom surface of the stationary work surface to the bottom surface of the collapsible work surface, enabling the collapsible work surface to pivot about said connection axis; and
an anterior support crossbar attached to the bottom surface and adjacent the front edge of the collapsible work surface;
at least one movable front leg, comprising:
at least one movable leg hinge attaching the at least one movable front leg to the stationary base for permitting the movable leg to pivot about the at least one movable leg hinge, and
a support cup for receiving the anterior support crossbar;
at least one posterior top crossbar attached to the at least two stationary back legs and the stationary base providing additional stability to the stationary base;
at least one posterior bottom crossbar attached to the at least two stationary back legs and the stationary base adding stability to the stationary base;
at least one stationary back leg telescoping hole positioned on the top of each stationary leg capable of receiving at least two backsplash support bars;
at least one telescoping hole cap capable of inserting into each stationary back leg telescoping hole in such a manner that the top of each stationary back leg becomes flush with the stationary base;
a flexible member connected parallel to the collapsible work surface hinge attaching the collapsible work surface to the stationary work surface; and
at least one vertical adjustment member positioned on the bottom each of the at least two stationary back legs
wherein the at least one stop bracket is configured, positioned and oriented to extend below the bottom surface of the stationary work surface for a sufficient distance to restrict continued pivoting of the movable leg around the movable leg hinge in an outer direction beyond perpendicular to the longitudinally extending front edge of said stationary top.

14. A method of use of a workstation mountable against a wall, comprising:
a. providing a workstation in a stowed position comprising:
a stationary base subassembly including:
at least two stationary back legs,
at least one wall mount attachment for attaching the stationary base to a wall,
a stationary work surface essentially rectangular in shape, having a planar top and bottom surface, a front edge, a back edge, and side edges, oriented in its longitudinal direction to extend along the wall when attached thereto, and
at least one stop bracket attaching the bottom of the stationary work surface to one of the at least two stationary back legs;
a collapsible top subassembly including:
a collapsible top having a planar top and bottom surfaces, a front edge, and a back edge, the dimensions between the front and back edges of the collapsible work top being substantially larger than the dimensions between the front and back edges of the stationary work surface, the collapsible top further including:
a collapsible work surface hinge having a horizontally extending axis, the collapsible work surface hinge connecting the stationary top to the collapsible top and defining a gap between the front edge surface of said stationary top and the back edge surface of said collapsible top, thereby enabling the collapsible work surface to pivot about the collapsible work surface hinge axis relative to the stationary top until said gap is closed; and
an anterior support crossbar attached to the collapsible top bottom surface disposed adjacent the front edge thereof;
at least one movable front leg subassembly, each movable front leg subassembly including: at least one movable leg hinge attaching the at least one movable front leg subassembly to the stationary base,
a pivotable leg, disposed away from said at least one movable leg hinge, capable of pivoting about said at least one movable leg hinge; and a support cup having two upstanding walls and a bottom surface for receiving the anterior support crossbar when the workstation is in the open position, b. mounting the workstation mountable against a wall, the workstation having an open position with the collapsible work surface being disposed horizontally and in a stored position having a compact configuration with the collapsible work surface being collapsed to a vertical position, c. raising the collapsible top by pivoting the front edge of said collapsible work surface for a sufficient distance to provide clearance for the at least one movable leg subassembly to be pivoted underneath the collapsible top;

d. pivoting the movable leg subassembly underneath the stationary top from a first position to a second position, wherein in the first position the stop member restricts the movable leg subassembly from further pivoting around the movable leg hinge in an outer direction beyond perpendicular to the longitudinally extending front edge of said stationary top, and wherein in the second position the movable leg subassembly is underneath the stationary top;

e. permitting the collapsible work surface to collapse to a vertical position so as to present the work station in a stowed position.

15. The method use of a workstation mountable against a wall according to claim 14, wherein the workstation is converted to an open position by f. pivoting the collapsible work surface to a horizontal position by lifting the front edge of the collapsible top to a position slightly acute relative to a plane parallel to the floor, thereby closing said gap between the front edge surface of the stationary top and the back edge surface of the collapsible top;

g. pivoting the at least one movable leg subassembly from the stowed position to an open position wherein the movable legs are pivoted away from the stationary top and toward the stop member, so that the movable leg subassembly is disposed essentially perpendicular to the longitudinal direction of the stationary top at a position wherein further pivoting of each movable leg subassembly is inhibited by the at least one stop bracket so it cannot be pivoted in outer direction beyond perpendicular;

h. collapsing for a short distance the front edge of the collapsible work surface until the work surface engages the movable leg subassembly, and thereby opening slightly the gap between the front edge surface of said stationary top and the back edge surface of said collapsible top; and i. engaging the anterior support crossbar and the support cup.

* * * * *